United States Patent
Karaoguz et al.

(10) Patent No.: US 8,825,025 B2
(45) Date of Patent: Sep. 2, 2014

(54) SPONSORED CELLULAR PHONE

(75) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 763 days.

(21) Appl. No.: 12/566,894

(22) Filed: Sep. 25, 2009

(65) Prior Publication Data

US 2011/0065423 A1 Mar. 17, 2011

Related U.S. Application Data

(60) Provisional application No. 61/242,977, filed on Sep. 16, 2009.

(51) Int. Cl.
| | |
|---|---|
| *H04M 3/42* | (2006.01) |
| *H04L 12/14* | (2006.01) |
| *H04W 8/24* | (2009.01) |
| *G06Q 30/02* | (2012.01) |
| *H04M 1/725* | (2006.01) |
| *H04M 15/00* | (2006.01) |
| *H04W 4/24* | (2009.01) |

(52) U.S. Cl.
CPC ............... *H04W 8/245* (2013.01); *H04L 12/14* (2013.01); *G06Q 30/02* (2013.01); *H04M 1/72569* (2013.01); *H04M 2250/10* (2013.01); *H04M 1/72525* (2013.01); *H04M 15/00* (2013.01); *H04L 12/1471* (2013.01); *H04M 2215/0192* (2013.01); *H04W 4/24* (2013.01)

USPC ........................................ 455/414.2; 455/566

(58) Field of Classification Search
USPC ............ 455/414.2, 456.3, 558, 414.1, 456.1, 455/456.2, 566
See application file for complete search history.

(56) References Cited

U.S. PATENT DOCUMENTS

| | | | |
|---|---|---|---|
| 2005/0060229 A1* | 3/2005 | Riedl et al. ...................... | 705/14 |
| 2009/0204640 A1* | 8/2009 | Christensen et al. ...... | 707/104.1 |
| 2010/0222041 A1* | 9/2010 | Dragt .......................... | 455/414.2 |
| 2010/0235886 A1* | 9/2010 | Muller et al. ..................... | 726/4 |

* cited by examiner

*Primary Examiner* — Myron K Wyche
(74) *Attorney, Agent, or Firm* — Garlick & Markison; Jessica W. Smith

(57) ABSTRACT

A cellular telephone or other wireless communications device supports association with a third party sponsor other than a network operator. The device establishes default user interface settings for the user interface consistent with association with the network operator. The device then determines a desired association with one or more third party sponsors. Based upon the desired association, the device retrieve third party sponsor settings. The device then alters its user interface settings based upon the third party sponsor settings, wherein the altered user interface settings differ from the default user interface settings. The device then communicates with a third party sponsor server computer via the communications interface to exchange information relating to operation of the cellular telephone. Multiple third party sponsors could share access to the user interface. The third party sponsor may be a business, a group of individuals, or another entity.

27 Claims, 11 Drawing Sheets

SPONSORED CELLULAR PHONE

CROSS-REFERENCE TO PRIORITY APPLICATION

The present application claims priority to U.S. Provisional Application No. 61/242,977, filed Sep. 16, 2009, which is incorporated herein in its entirety for all purposes.

BACKGROUND OF THE INVENTION

1. Field of the Invention

The present invention relates generally to communication devices; and more particularly to wireless communication devices.

2. Description of the Related Art

Communication systems are well known. Communication systems include wired communication systems such as the Public Switch Telephone Network (PSTN), the Internet backbone, Local Area Networks (LANs), fiber optic networks, cable networks, and various other communication networks serviced by wired or hard media. Wireless communication systems include cellular communication networks, Wireless Wide Area Networks (WWANs), Wireless Local Area Networks (WLANs), and Wireless Personal Area Networks (WPANs). Cellular networks, WWANs, and WLANs are typically supported by wired network infrastructures. Cellular networks include base stations that service wireless links with cell phones. WWANs include access points that support communications with WWAN enabled devices. WLANs also typically include an infrastructure and one or more access points that support communications for WLAN enabled devices. WPANs typically support point to point communications between two or more WPAN enabled devices. Examples of WLANs include 802.11x networks, examples of WPANs include Bluetooth networks, examples of WWANs include WiMAX networks, and examples of cellular networks include CDMA networks, TDMA networks, WCDMA networks, FDMA networks, and/or various other types of wireless links serviced. For example, cellular networks may include North American CDMA networks such as those that are currently installed, GSM networks, North American TDMA networks, WCDMA networks, and/or various other types of communication standardized networks.

Cellular phones are typically associated with a single cellular network service provider. New cellular phones, while manufactured by various companies, in order to receive service from a particular cellular network, are associated with the cellular network. Such association is typically established with a Subscriber Identity Module (SIM) card that a subscriber inserts into his/her cellular phone. The SIM card has an association with a particular servicing network provider and validates the cell phone with that network service provider. Of course, a cell phone may roam and receive service from differing network service providers, with particular roaming charges applied to the subscribed user. Further, when a user travels to remote locations that are not serviced by a primary network service provider he/she may obtain another SIM and insert the SIM in his/her cell phone to receive service from a differing cellular network.

Association of the cell phone with a particular network service provider typically includes the cell phone having a user interface based upon the association with the network service provider. For example, a cell phone that is subscribed with AT&T may include AT&T network service provider information displayed to a user on a display of the user interface. In such case, the AT&T logo may be displayed upon the cell phone. Further, various other characteristics of the cell phone are determined based upon the association of the cell phone with AT&T as the network service provider.

Due to limitation no association with a single network service provider to the cell phone, the user is somewhat constrained in his/her ability to operate the cell phone. While some cell phones may be customized by the user, such customization typically runs counter to the settings of the cell phone as it is associated with the network service provider. These and other shortcomings of the prior system devices will be further revealed herein with reference to the figures, description, and claims of the present invention.

BRIEF SUMMARY OF THE INVENTION

The present invention is directed to apparatus and methods of operation that are further described in the following Brief Description of the Drawings, the Detailed Description, and the claims. Other features and advantages of the present invention will become apparent from the following detailed description of the invention made with reference to the accompanying drawings.

DETAILED DESCRIPTION

Figure 1:
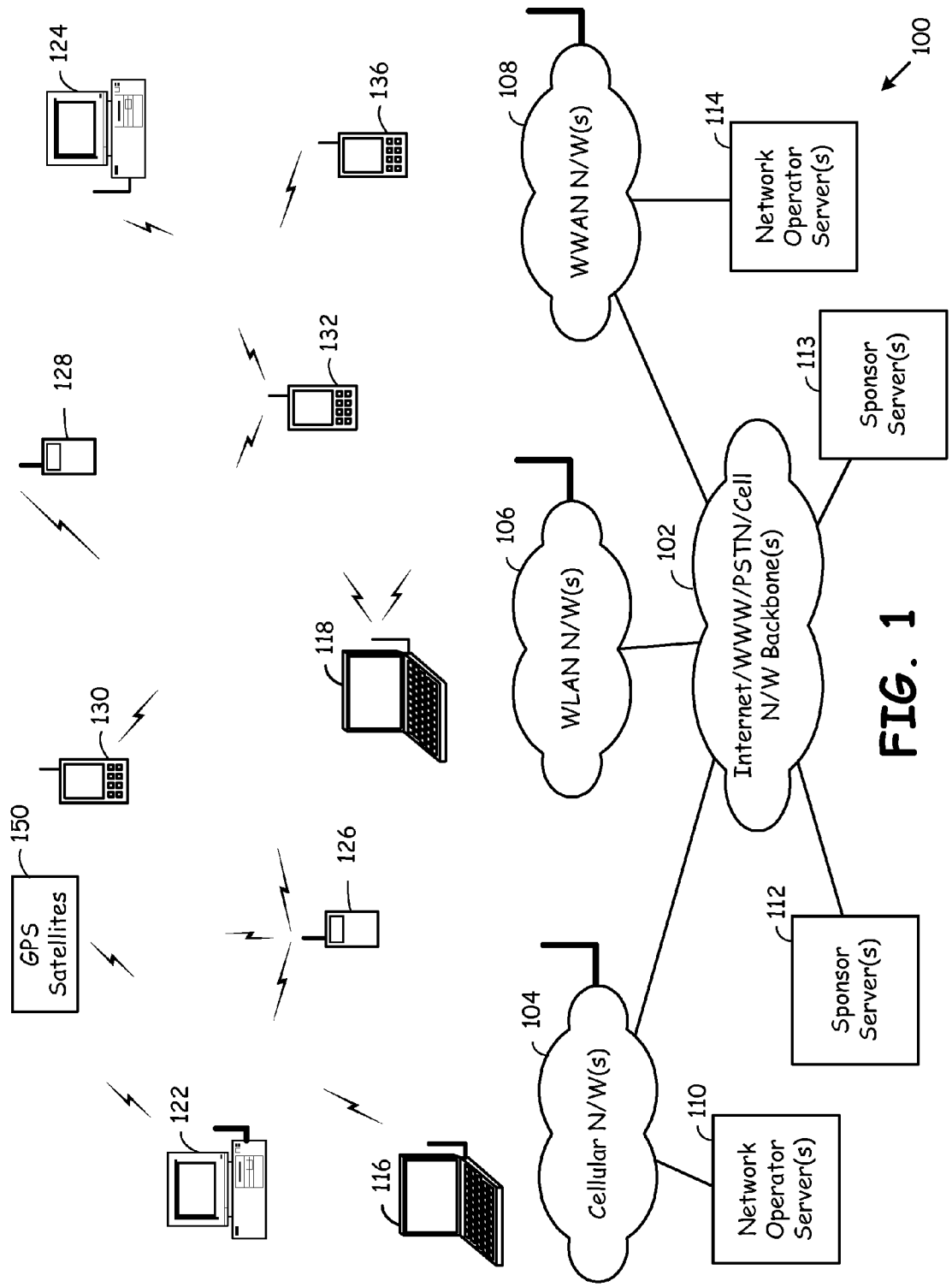
FIG. 1 is a system diagram illustrating a plurality of wireless networks and a plurality of cell phone/wireless network enabled devices.

FIG. 1 is a system diagram illustrating a plurality of wireless networks and a plurality of cell phone/wireless network enabled devices. The system 100 includes a plurality of wireless network infrastructures and a plurality of wireless enabled devices. Each of the network infrastructures supports wireless communications with one or more of the wireless devices. Herein, each of these wireless devices may be referred to as a cell phone even though its wireless link may be supported by a non-cellular communication standard. Thus, according to the present invention, any reference to cell phone or cellular telephone is to be interpreted as that of a wireless phone or wireless device that is supported by a wireless infrastructure. Further, some or more of the wireless devices illustrated in FIG. 1 may support multiple communication standards such that it/they can support communications not only with a cellular network infrastructure but with a Wireless Local Area Network (WLAN) infrastructure, a Wireless Wide Area Network (WWAN) infrastructure, within a Wireless Personal Area Network (WPAN), and/or with another wireless network.

The system 100 of FIG. 1 includes an Internet/Worldwide Web/PSTN/cell phone network backbone 102. Such network backbone 102 couples to a cellular network infrastructure 104, a WLAN network infrastructure 106, and/or a WWAN network infrastructure 108. For simplicity, a single cloud is shown for the network backbones 102. However, in many embodiments, each of the cellular network infrastructure 104, the WLAN network infrastructure 106, and/or the WWAN network infrastructure 108 may include separate network backbones. These various network backbones may be circuit switched, and/or packet switched networks.

Cellular network 104 supports wireless communications with one or more of wireless devices 116, 118, 122, 124, 126, 128, 130, 132, and/or 136. The cellular network 104 supports cellular communications according to one or more TDMA, FDMA, and/or CDMA communication standards, e.g., North American CDMA, WCDMA, LTE, EDGE, GPRS, GSM, etc. The WLAN network infrastructures 106 may support communications according to any of the various 802.11x communication standards. The WWANs network infrastructure 108 may support communications according to the WiMAX operating standard, for example.

Various types of wireless devices are illustrated with the system 100 of FIG. 1. For example, these wireless devices may include laptop computers 116 and 118, desktop computers 122 and 124, cellular phones 126 and 128 and/or wirelessly enabled terminals 130, 132, and/or 136. Each of these wireless devices 116-136 includes one or more wireless network interfaces that support wireless communications with one or more of cellular network 104, WLAN 106, and/or WWAN 108 network infrastructures, and/or point to point communications, e.g., WPAN communications. Moreover, each of these wireless devices 116-136 may include a GPS receiver that receives signals from a plurality of GPS satellites 150 to assist in determining GPS coordinates of the wireless devices 116-136.

According to various aspects of the present invention, any of the wireless devices 116-136 may establish an association with a third-party sponsor. Such third-party sponsor may be a corporation or another business entity that sells products or services. The third-party sponsor may also simply be an individual or group of persons, e.g., a family, a business group, a club, etc. The desired association with a wireless device 116-136 causes a relationship to exist between the third-party sponsor and the wireless device. Supporting such relationships are sponsor servers 112 and 113 that couple to the network backbone 102. As contrasted to the association with a network operator, an association with the sponsor server may provide direct marketing and/or operational advantages to the wireless device 116-136. Network operator server 110 provides network operator services for cellular networks 104 while network operator server 114 provides network operation support for the WWANs networks 108. As will be described further herein, multiple methodologies may be used to establish an association of the third-party sponsor with one or more of the wireless devices 116-136. Such techniques may include providing options to a user for association with a third-party server. Such options may be provided via a communication link between a wireless device 118 and a sponsor server 112, for example. Further, such association with a third-party sponsor may be established via a dedicated server such as network operator server 114 that provides options to a user of wireless device 118 for selection and subsequent association with a third-party sponsor.

As will be described further herein, association with a third-party sponsor may provide operational advantages to a user of a wireless device. For example, such association may allow the user to download user interface settings not available via the network operator. Such user interface settings may include software components that provide enhanced functionality to the wireless device. Such software components may include a COder/DECoder (CODEC) that is/are received from the sponsor server in response to the association with the third-party sponsor. The CODEC may be subsequently enacted to process custom content received from a third-party sponsor computer, e.g., 113 to provide a user interface experience to a user of the wireless device.

Further examples of operations supported according to the present invention based upon association with a third-party sponsor include receiving electronic advertisements from a third-party sponsor server 112, for example. These electronic advertisements are displayed upon the user interface of wireless device 132, for example. These electronic advertisements may provide coupons or click-thru ads to a user of the wireless device. Usage of the cellular telephone 132 may result in further sponsor benefits, e.g., certain usage of the cell phone 132 results in sponsor benefits such as discounts for products or services. Based upon the association as well with the third-party sponsor, the sponsor server 112 may download sponsor ads to the cell phone 132 when the phone is idle. Such is possible because the association between the cell phone 132 and the third-party sponsor as enabled by sponsor server 112. Because of association, the sponsor server 112 is able to determine when the cellular phone 132 is idle and will download sponsor ads only when such idle conditions occur.

According to another aspect of the present invention, the sponsor server 112 may receive GPS coordinates of cell phone 128. In such case, the sponsor server 112 may then provide information to the cell phone 128 that causes the cell phone to display a map to the user indicating a location of the cell phone 128 and the location of at least one third-party sponsor site on the map. For example, when the sponsor operates a chain of coffee shops, the sponsor server 112 provides GPS coordinates of a plurality of coffee shops that are proximate to the cell phone 128. The cell phone 128 then displays on the map the location of the coffee shops along with a current location of the cell phone 128. Further, the sponsor server 112 may download discounts for purchase of coffee at the proximately located coffee shops that the user of cell phone 128 may use to receive a discount on coffee at the coffee shops. Such coupon, however, which is electronic in form, may be limited for download and usage at one of the identified coffee shops via communication by a WPAN interface or WLAN interface local to the coffee shop. In such case, the coupon exchange between the cell phone 128 and an access point of WLAN of the coffee shop is secure and prevents unauthorized use of electronic coupons to purchase coffee at the location.

Additional operations according to the present invention may include downloading a sponsor related ringtone to the cell phone and enacting the sponsor related ring tone upon the third-party association. Additionally, another operation based upon association with the third-party sponsor may include receiving third-party sponsor settings that include a sponsor telephone directory for subsequent display on a user interface of the cell phone. Other operations may include downloading a sponsor sales media interface to the cell phone and altering the user interface to include the sponsor sales media interface. Moreover, operations subsequent to association of the third-party sponsor may include receiving at least one sponsor website link and altering a user interface of the cell phone to include the at least one sponsor website link. Further, for gaming environments, a third-party sponsor, which may be a gaming company, may download a sponsor gaming interface to a cell phone 130 or wirelessly enabled device 122 based upon association of the third-party sponsor. The user interface then may be altered to include the sponsor gaming interface.

According to still other aspects of the present invention, each of the wireless devices has hardware components that may be configured/reconfigured based upon the sponsor association. For example, the wireless devices may have wireless interfaces, processing circuitry, user interface components, and/or other components that are configured/reconfigured based upon the sponsor association. Such configuration/reconfiguration may be initially set based upon one or more initial sponsor associations and may be reset/reconfigured over time and/or based upon additional sponsor associations. These aspects of the present invention will be described further with reference to FIGS. 10 and 11.

Figure 2:
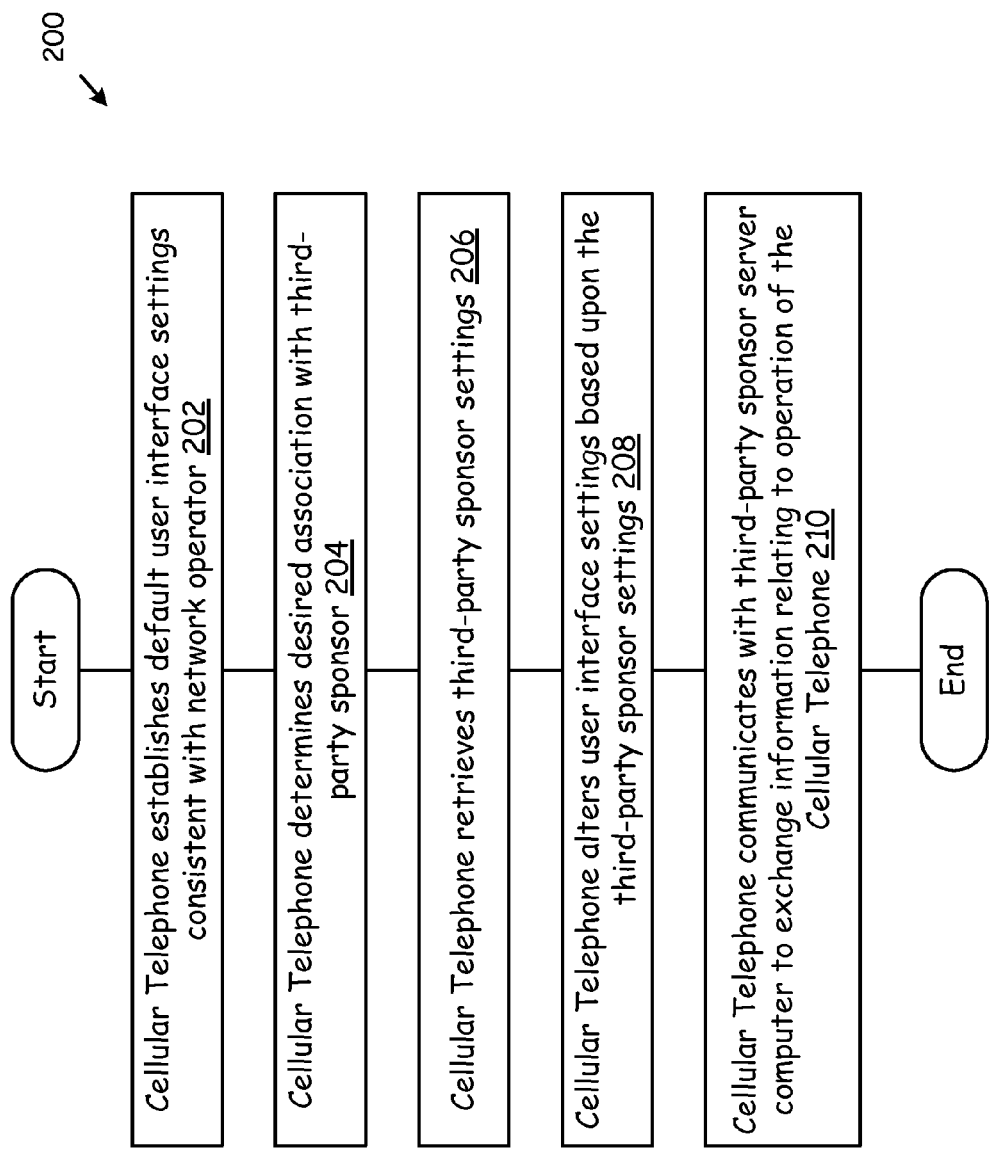
FIG. 2 is a flow chart illustrating operation according to one or more embodiments of the present invention.

FIG. 2 is a flow chart illustrating operation according to one or more embodiments of the present invention. The operations 200 of FIG. 2 commence with the cellular telephone establishing default user interface settings consistent with a network operator association (Step 202). These default user interface settings are typically established when a user inserts a Subscriber Identity Module (SIM) card into a cell phone or other wirelessly enabled device and the cell phone registers with its network operator. Upon registration, the cell phone sets its default user interface settings based upon its association with the network operator.

Operation proceeds with the cellular telephone determining a desired association with a third-party sponsor (Step 204). As will be subsequently described herein, this association may be determined upon insertion of a differing SIM card that is associated with the third party sponsor, upon registration with a third-party sponsor via a wired or wireless link, or another technique employed for such third-party sponsor association.

The cellular telephone then retrieves the third-party sponsor settings based upon the association with the third-party sponsor (Step 206). The third-party sponsor settings may be retrieved via the wireless interface of the cell phone, via a tethered interface of the cell phone, or via a combination of wired and wireless communication links. The cellular telephone then alters its user interface settings based upon the third-party sponsor settings (Step 208). Alteration of the user interface settings may include enacting a completely different user interface experience for the user, displaying third-party sponsor links upon the user interfaces cell phone, or enacting various other alterations of the user interface based upon the third-party sponsor association. Finally, the cellular telephone communicates with the third-party sponsor server computer to exchange information relating to operation of the cellular telephone (Step 210). Such exchange of information may include receiving an advertisement of the third-party sponsor, uploading user operational characteristics of the cell phone to the third-party sponsor server, or a combination of both of these operations in order to enhance the users operating experience. For example, coupons or advertisements may be downloaded to the cellular telephone from the third-party sponsor server based upon characteristics of the operation of the cellular telephone. Examples of such operation were previously described with reference to FIG. 1 and will be subsequently described herein with reference to subsequent figures.

The cell phone settings that are set/altered based upon the third-party sponsor settings may be temporarily set or permanently set. Further, as will be described further with reference to FIG. 5, the operation of the cell phone may be configured/reconfigured to accommodate multiple third-party sponsors. Such alteration may be based upon time, e.g., hourly, daily, based upon user input, e.g., user profile settings, user command, and/or may be based upon location of the cell phone, e.g., GPS location compared to GPS location profile. For example, when a user of the phone is proximate to a sponsor location, e.g., coffee shop, third-party sponsor settings corresponding to the coffee shop owner may be enacted with such third-party sponsor settings ceased after the cell phone is a certain distance away from the coffee shop. Such operations could also be performed based upon time of day. In the morning when a user of the cell phone typically purchases coffee the cell phone could enact the third-party sponsor settings for the cell phone. Then, after a typical time period in which the user would typically buy coffee, other third party sponsor settings may be enacted, e.g., those relating to lunch based sponsors, exercise based sponsors, after hour based sponsors, or other sponsors. Based upon the time of day, particular advertisements may be provided to a user of the cell phone, attempting to influence the purchasing decisions of the user. With another example, the cell phone could enact one set of sponsor settings one day and another set of sponsor settings another day.

Figure 3:
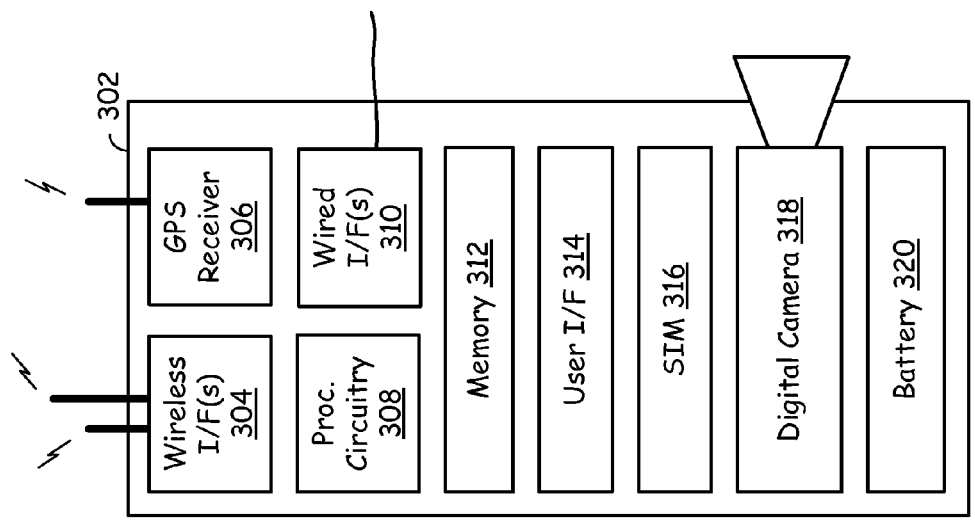
FIG. 3 is a block diagram illustrating a cell phone constructed according to one or more embodiments of the present invention.

FIG. 3 is a block diagram illustrating a cell phone constructed according to one or more embodiments of the present invention. The cell phone 302 includes one or more wireless interfaces 304, a GPS receiver 306, processing circuitry 308, and one or more wired interfaces 310. Further, the cell phone 302 includes memory 312, one or more user interfaces 314, a SIM card 316 (receptacle for SIM card), a digital camera 318, and battery 320. Wireless interfaces 304 may include one or more of a cellular network interface, a WWAN network interface, a WLAN network interface, and/or a WPAN network interface. The communication standards supported by several of these wireless interfaces was described herein with reference to FIG. 1. The GPS receiver 306 receives GPS information from a plurality of GPS satellites to enable determination of GPS coordinates of the cell phone 302.

Processing circuitry 308 includes one or more or multiple of a system processor, digital signal processor, application specific integrated circuit (ASIC), custom logic, and/or other hardware components. Processing circuitry 308 enables execution of software instructions stored in memory 312 and processing of data that is also stored in memory 312, written to memory 312, and/or retrieved from memory 312. The wired interface 310 may include one or more of a serial interface and/or a parallel interface. For example, the wired interface 310 may include a USB interface, a fire wire interface, or another type of interface that enables wired communications of the cell phone 302 to another device also coupled to a wireless link.

Memory 312 includes one or more RAM, ROM, FLASHRAM, FLASHROM, magnetic memory, optical memory, and/or another type of memory capable of storing software instructions and data. The user interface 314 may include a display, a keyboard, a pointing device, microphone, speakers, and/or other components that interface the cell phone 302 with the user. The SIM 316 is associated with a network operator or a combination of a network operator and one or more third-party sponsors. The SIM 316 identifies the cell phone 302 for subsequent operations in conjunction with a network operator and/or a third-party sponsor. Digital camera 318 is operable to take still and/or moving pictures and store such in memory 312. Battery 320 provides power for the cellular phone 302.

According to one aspect of the present invention, a desired association of the third-party sponsor is based upon receipt of data from the SIM 316 of the cellular phone 302. According to another aspect of the present invention, the cellular phone 302 is operable to identify via a display of the user interface 314 a plurality of available third-party sponsors. Further, the cellular phone 302 is operable to receive input via the user interface 314 from a user indicating selection of the third-party sponsor of a plurality of available third-party sponsors. Further, according to another aspect of the present invention, processing circuitry 308 is operable to receive a coder/decoder (CODEC) from a sponsor computer in response to association of third-party sponsor. Then, processing circuitry 308 is operable to enable operation of the CODEC to thereby alter user interface settings to process content receipt of a third-party sponsor computer.

Figure 4:
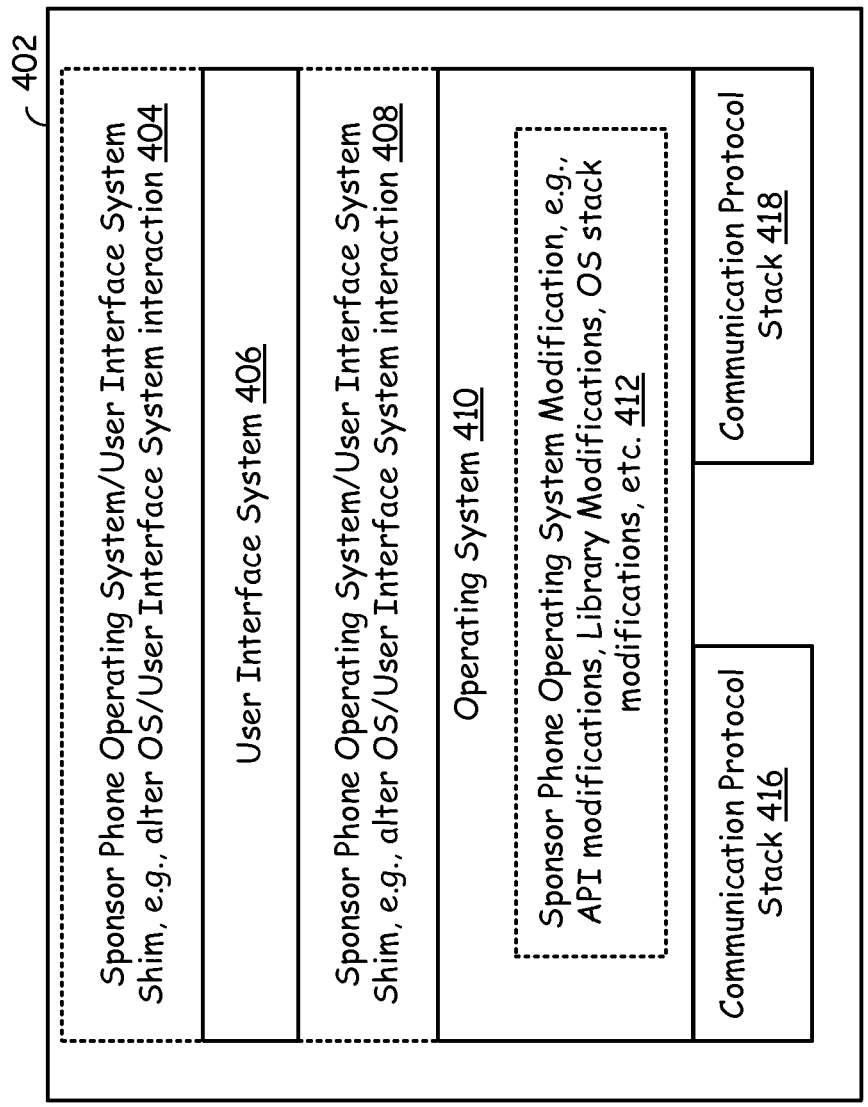
FIG. 4 is a block diagram illustrating functional software components of a cell phone constructed according to one or more embodiments of the present invention.

FIG. 4 is a block diagram illustrating functional software components of a cell phone constructed according to one or more embodiments of the present invention. As shown in FIG. 4, a communication/operational software protocol stack 402 includes a plurality of components. The software protocol stack 402 illustrated in FIG. 4 is not intended to be expansive or fully detailed with respect to the operations of the present invention but instead is intended to provide a general operational framework for the manner in which software of the cell phone may be modified to enable or instantiate aspects of the present invention. The software stack 402 includes communication protocol stacks 416 and 418, operating system 410, a sponsor phone operating system/user interface system shim 408, user interface system 406 and sponsor phone operating system/user interface system 404.

Communication protocol stacks 414 and 418 support one or more communication interface standards to enable communication between a cell phone and a network infrastructure or another wirelessly enabled device. The operating system 410 is initially loaded onto the cell phone via the network operator or is pre-loaded from manufacture of the cell phone. According to the present invention, the operating system 410 may be modified based upon sponsor phone operating system modification 412. Modifications 412 to the operating system 410 may include application program interface (API) modifications, library modifications, operating system (OS) stack modifications, etc. These modifications to the operating system 410 are done based upon association with the third-party sponsor. These modifications of the operating system 410 modify the manner in which the cell phone functions. Another technique that may be employed to modify operations of the cell phone according to the present invention is to install a shim 408 between user interface system 406 and the operating system 410. This shim is a sponsor phone operating system/ user interface system shim 408 that alters the OS/user interface system interaction. Further, another technique to modify the cellular telephone to operate according to the present invention is to install the sponsor phone operating system/ user interface system shim 404 above user interface system 406. The sponsor phone operating system/user interface system shim 404 alters the OS/user interface system interaction to modify operation of cell phone based upon the association of third-party sponsor.

Figure 5:
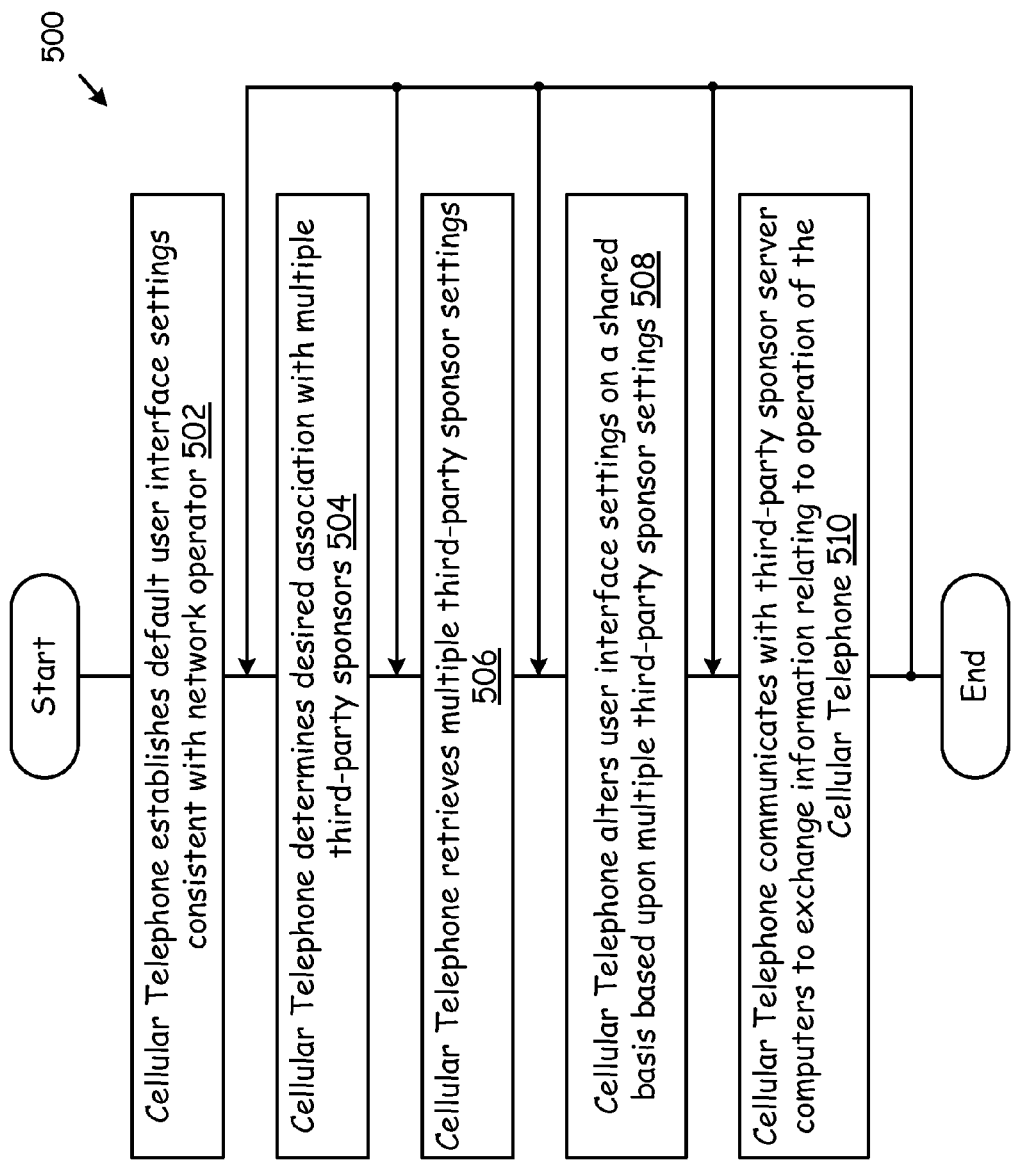
FIG. 5 is a flow chart illustrating operation according to another embodiment of the present invention.

FIG. 5 is a flow chart illustrating operation according to another embodiment of the present invention. The operations 500 of FIG. 5 differ from those illustrated previously in FIG. 2 in that the cell phone has association with a plurality of third-party sponsors. The operations 500 of FIG. 5 commence with the cellular telephone establishing default user interface settings consistent with a network operator (Step 502). The cellular telephone then determines a desired association of multiple third-party sponsors (Step 504). Then, based upon the association of multiple third-party sponsors, the cellular telephone receives multiple third-party sponsor settings (Step 506). The cellular telephone then alters the user interface settings on a shared basis based upon the multiple third-party sponsor settings (Step 508).

For example, the multiple third-party sponsor settings may be complementary in that the user interface may be shared by the multiple third-party sponsors. However, in another embodiment, the user interface may be time divided between the multiple third-party sponsors such that one of the third-party sponsors has access to user interface at one point and time and another of the third-party sponsors has access to the user interface at a second point and time. This concept may have extended to more than two third-party sponsors so that the user interface changes somewhat over time based upon a then enacted third-party sponsor. Sharing of the user interface between the third-party sponsors may be based upon a value established for each of the third-party sponsors. Higher value third-party sponsors may have greater access to the user interface of the cell telephone while lower valued third-party sponsors may have lesser access to the user interface of the cellular telephone.

Then, the cellular telephone communicates with third-party sponsored computers associated with the multiple third-party sponsors to exchange information related to operation of cellular telephone (Step 510). From Step 510, operation may end or may return to any of Steps 504, 506, and/or 508 where other third-party sponsors associations are established or serviced.

Figure 6:
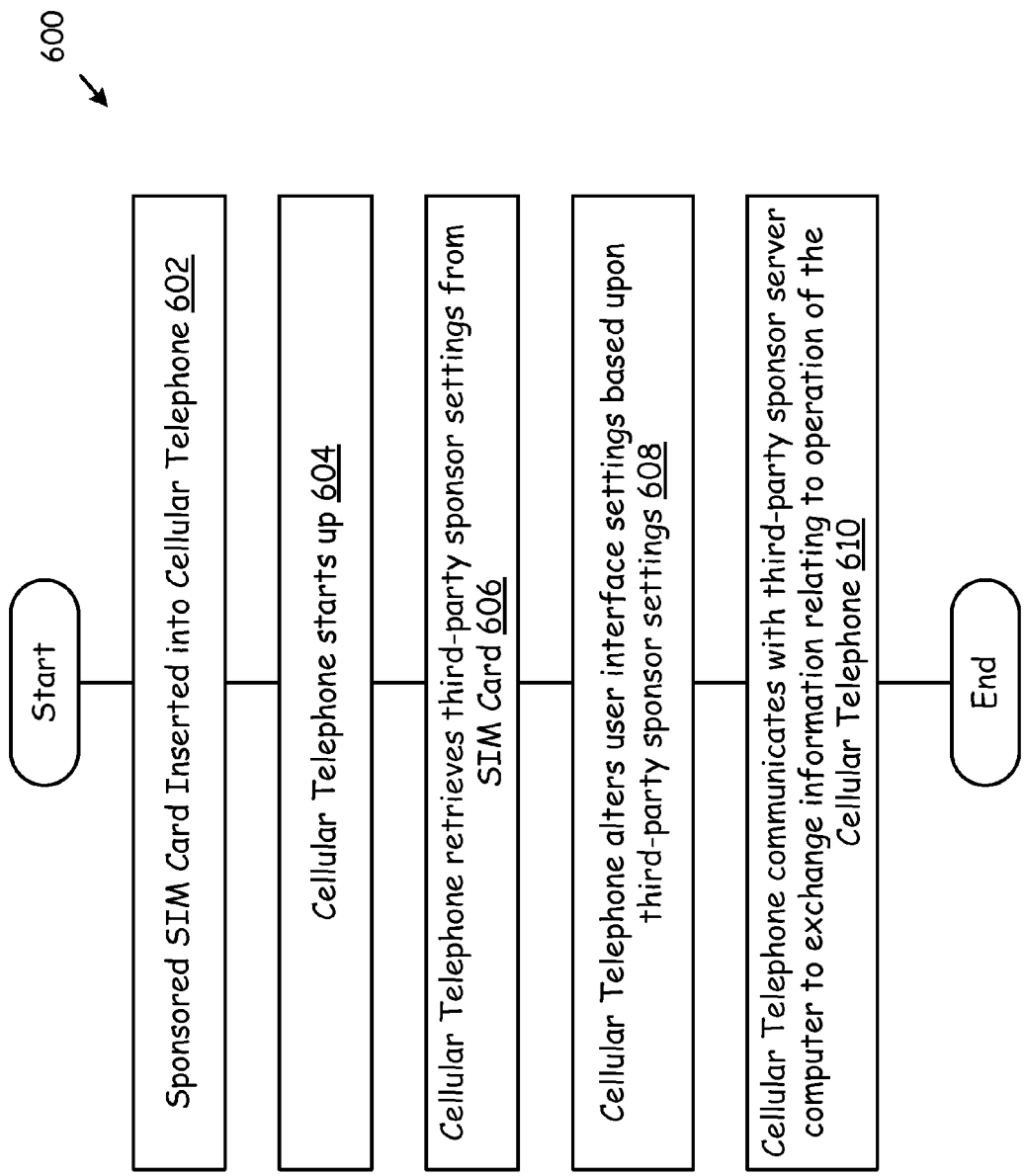
FIG. 6 is a flow chart illustrating operation according to yet another embodiment of the present invention.

FIG. 6 is a flow chart illustrating operation according to yet another embodiment of the present invention. The operations 600 of FIG. 6 begin with the insertion of the sponsor SIM card into the cellular telephone (Step 602). The sponsor SIM card includes attributes relating to both the network operator that serves as the primary interface for the cellular telephone, e.g., AT&T and also one or more third-party sponsors. The sponsored SIM card inserted at Step 602 may be received from the third-party sponsor or from the network operator itself that provides the SIM card in conjunction with the third-party sponsor association.

The cellular phone then restarts or starts-up with the sponsored SIM card inserted into a SIM card receptacle of the cellular telephone (Step 604). The cellular telephone then receives third-party sponsor settings from the SIM card (Step 606). Upon receipt of the third-party sponsor settings from the SIM card the cellular telephone registers with the network operator (and optionally third party sponsor) based upon the SIM card settings. The cellular telephone then alters its user interface settings based upon the third-party sponsor settings (Step 608). User interface settings may be determined by default based upon the association with the network operator and then may be altered based upon association with the third-party sponsor corresponding to the SIM card. The cellular telephone then communicates with the third-party sponsor server computer to exchange information relating to operation of cellular telephone (Step 610). The operations performed at Step 608 and 610 are consistent with the operations previously described for a cellular telephone.

Figure 7:
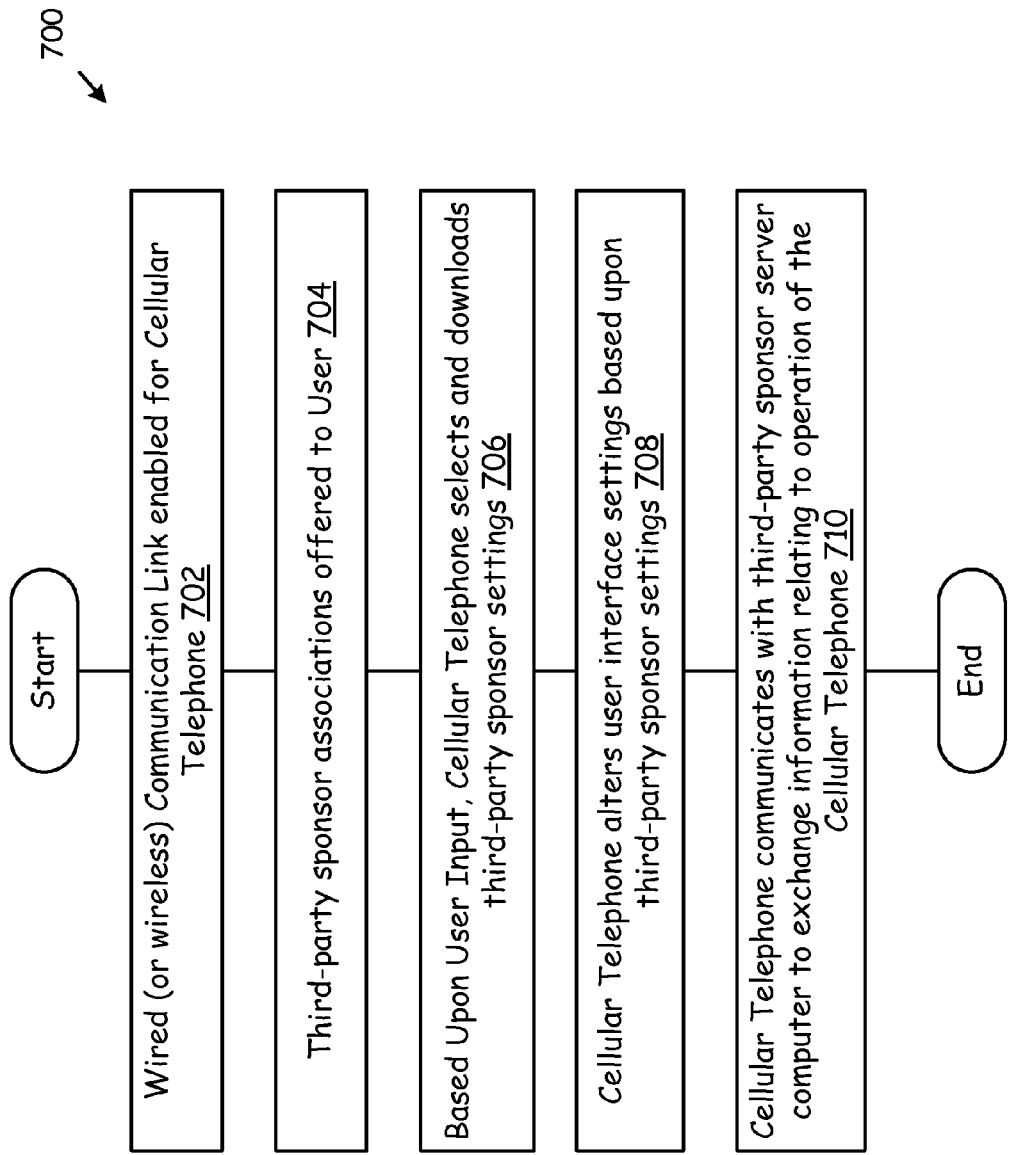
FIG. 7 is a flow chart illustrating operation according to still another embodiment of the present invention.

FIG. 7 is a flow chart illustrating operation according to still another embodiment of the present invention. The operations 700 of FIG. 7 are performed with the association of the third-party sponsor via a wired or wireless communication link of the cellular telephone. In particular, the wired or wireless communication link is enabled for the cellular telephone (Step 702). This wired or wireless communication link may be serviced by a wireless interface of the cellular telephone or a wired interface of the cellular telephone. Using this communication link, the cellular telephone offers third-party sponsor associations to the user (Step 704). In offering the third-party sponsor associations, the cellular telephone may link to a website sponsored by one or more third-party sponsors or with a server associated with the network operator. A web browser of the cellular telephone may be employed in offering a plurality of third-party sponsors association available to the user consistent with a network operator.

Based upon user input, the cellular telephone selects, associates with, and downloads third-party sponsor settings (Step 706). The third-party sponsor settings may be downloaded from a third-party sponsor computer, a centralized third-party sponsor computer, or a network operator server based upon the particular operation employed. Then, the cellular telephone alters user interface settings based upon the third-party sponsor settings (Step 708). The manner in which the user interface settings are altered at the operation of Step 708 is consistent with the operations previously described with reference to FIGS. 1-6 and as will be subsequently described with reference to FIGS. 8 and 9. The cellular telephone then communicates with the third-party sponsor server computer to exchange information relating to the operation of cellular telephone (Step 710).

Figure 8:
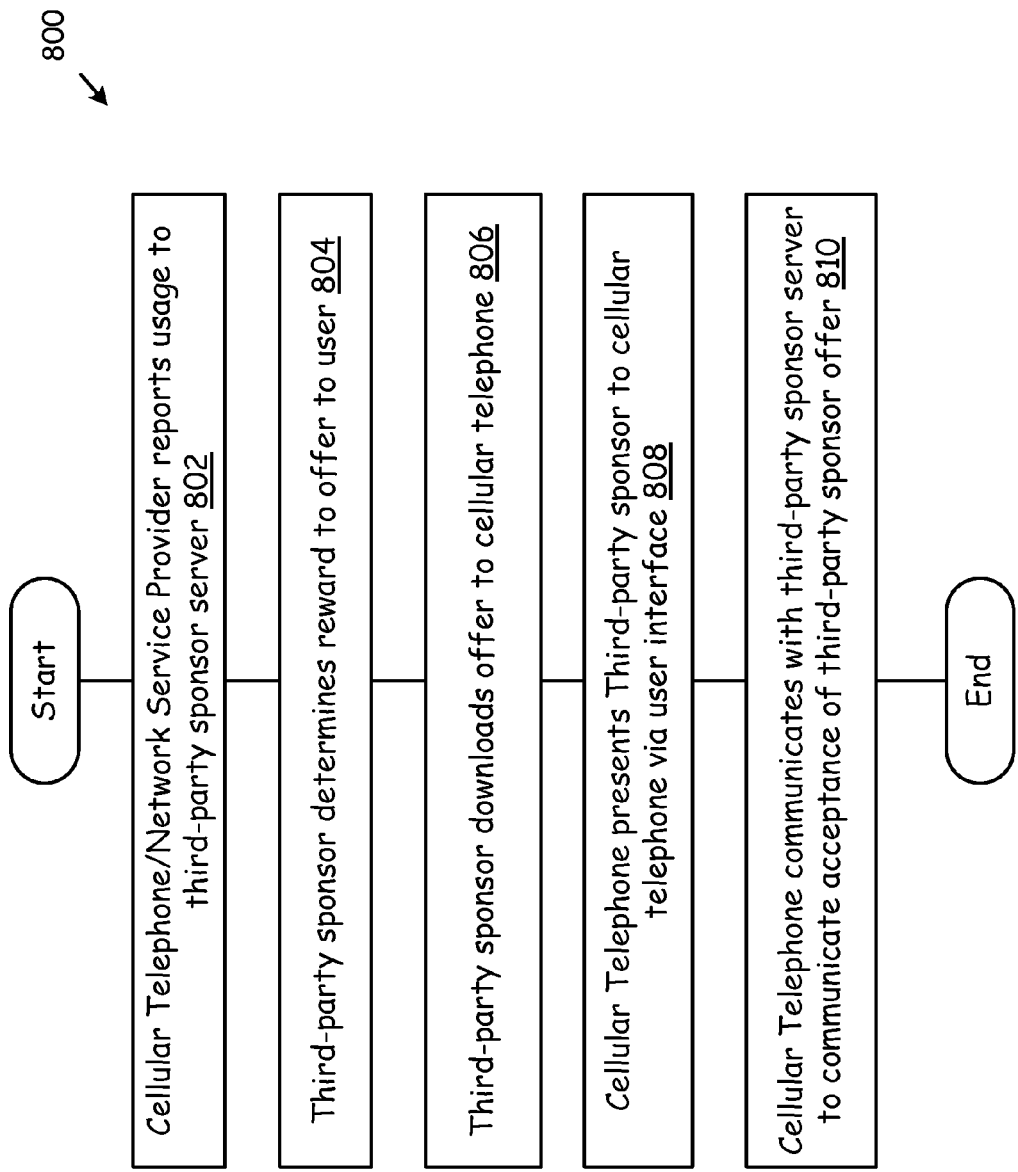
FIG. 8 is a flow chart illustrating operation according to yet another embodiment of the present invention.

FIG. 8 is a flow chart illustrating operation according to yet another embodiment of the present invention. The operations 800 of FIG. 8 commence with the cellular telephone/network service provider reporting usage to a third-party sponsor server (Step 802). Some of the offers provided in association with the third-party sponsor for the cellular telephone may provide benefits to the user of the cellular telephone based upon certain usage levels, e.g., 200 minutes, 500 minutes, 1000 minutes, etc. The third-party sponsor then determines rewards to offer to the user of the cellular telephone based upon the usage (Step 804). Offers that may be made to the user of the cellular telephone via the cellular telephone include, for example, coupons provided to the cellular telephone for a particular service offered by the third-party sponsor. Other examples of offers would be simply advertisements that are provided only to the user of the cellular telephone based upon a particular level of usage of the cellular telephone by the user.

Based upon either automatic operations or based upon input received from the cellular telephone from user input, the third-party sponsor server downloads the offer or offers to the cellular telephone (Step 806). The cellular telephone then presents the third-party sponsor offer to the cellular telephone via the user interface (Step 808). The cellular telephone then communicates with the third-party sponsor server to communicate acceptance of one or more of the third-party sponsor offers (Step 810). For example, an electronic coupon may be provided to the cellular telephone and presented to the user via the user interface. Such offer may require the user to go to a location of the third-party sponsor for collection of benefits corresponding to the coupon. With the example of the coffee shop, a coupon for a free cup of coffee may be provided to the user of the cellular telephone when user reaches certain minute usage levels or data quantity download usage. This coupon may be then received by a wireless network of the coffee shop using a WLAN or WPAN communication interface of the cell phone. In this fashion, the offer/coupon may be used when localized wireless communications with a particular retail location of the coffee shop is met.

Alternatively, the usage of the cellular telephone by the user may result in rewards for merchant credit that is applied to a merchant account corresponding to the user before the particular merchant. Upon acceptance of the reward and usage thereof by the user of the cell phone, a report may be sent to the sponsor server that confirms the acceptance of the offer. Acceptance of the offer may result in additional operations or additional offers provided to the user of the cellular telephone by the third-party sponsor.

Figure 9:
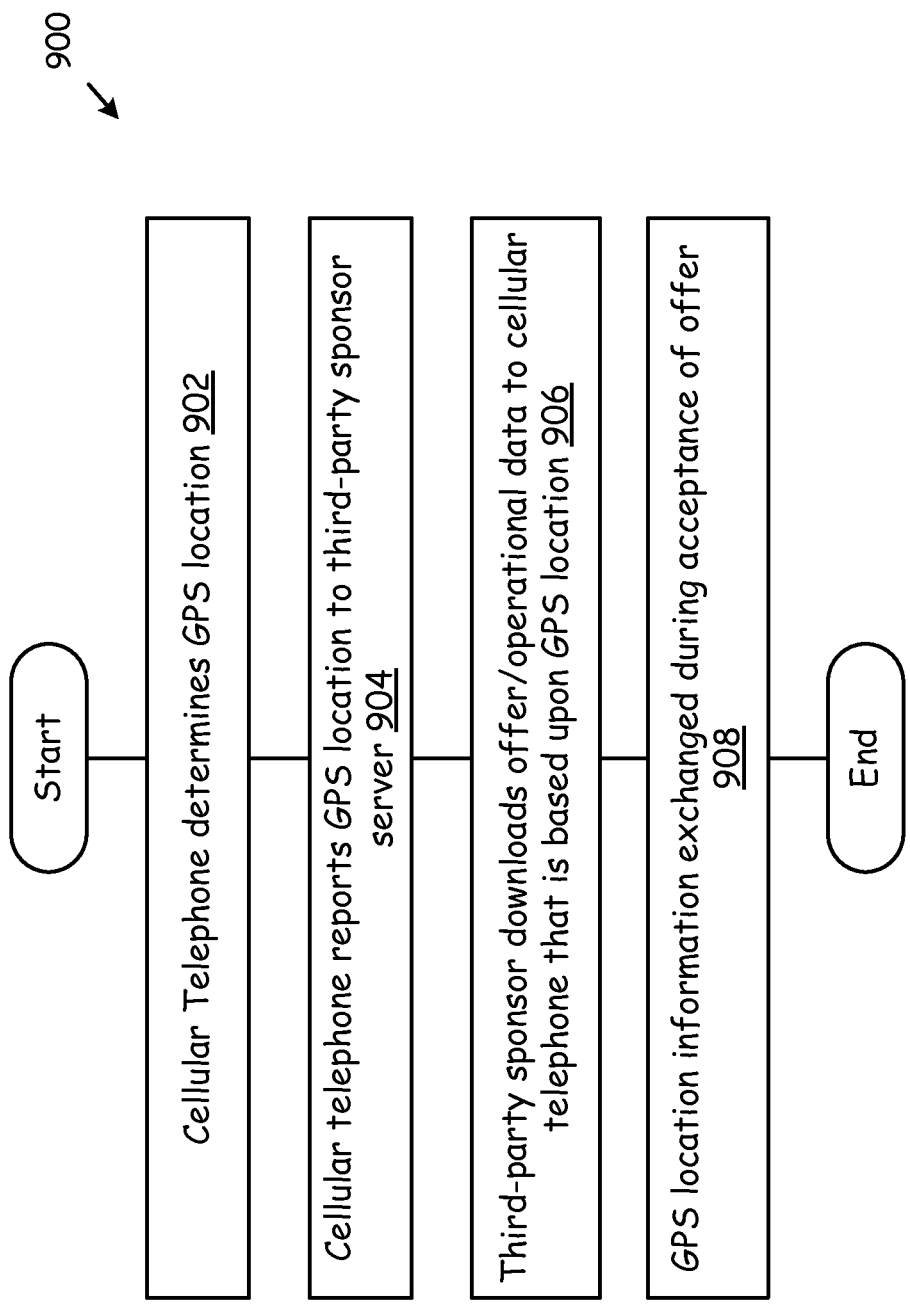
FIG. 9 is a flow chart illustrating operation according to still another embodiment of the present invention.

FIG. 9 is a flow chart illustrating operation according to still another embodiment of the present invention. The operations 900 of FIG. 9 commence with the cellular telephone determining its GPS location (Step 902). The cellular telephone then reports its GPS location to a third-party sponsor server (Step 904). The third-party sponsor computer then downloads offers/operational data to the cellular telephone that is based upon the GPS location received (Step 906). Such third-party sponsor downloads offers/operational data may include downloading a map or map data to the cellular telephone that relates to locations of third-party sponsor server stores that allows the cellular telephone to determine its location with reference to the stores of the third-party sponsor. The GPS location information may be exchanged during the acceptance of an offer made by the third-party sponsor (Step 908). Thus, the operations 900 of FIG. 9 support additional offers and exchange of data or operational configurations to the cellular telephone that are further based upon a GPS location of cellular telephone and location preferences of the third-party sponsor.

The described aspects of the present invention may include additional user interface setting alterations as well, including the alteration of phone settings, display background, tools, menus, and other phone settings. Other usage models could include sponsor related menus for food, e.g., pizza, being provided as the altered user interface. The sponsor related menu could then be used to place orders with the sponsor. Such ordering could use GPS coordinates of the wireless device to place an order with a most proximate location or one that will be later proximate, e.g., based upon navigation route of the wireless device. In such case, the order would be placed with a location proximate to an ending location of a GPS based route.

Offers made by the third party sponsor could be time limited. Further, partnering between the network operator and the third party sponsor could be established such that upon making a purchase or acceptance of an offer with a third party sponsor, the network operator provides additional services at a reduced rate or for free. For example, considering the coffee shop example, a user of the wireless device could receive cellular network service upon purchase of a set number of items, e.g., 200 free minutes of coverage or a particular data download quantity, e.g., 10 Gigabytes of data, upon purchase of five cups of coffee.

The third party sponsor relationship could also be established when the wireless device enters a locale, such as a theme park or shopping mall. When the wireless device enters such locale, the user interface could be altered based upon the third party sponsor relating to the locale. In such case, the map of a mall or theme park could be provided to the user upon the wireless device upon establishing the third party sponsor relationship. A gaming or couponing application could then be established for the wireless device that corresponds to the locale in which the wireless device is operating. Subsequently, when the wireless device leaves the locale, by GPS coordinate determination or cessation of WLAN coverage, the special interface could be removed/disabled.

The third party sponsor relationship may also provide an information sharing platform. For example, when the third party sponsor settings is for a family, for example, members of a third party sponsor group may use the third party sponsor computer to exchange information regarding their activities, where to eat, etc.

According to another aspect of the present invention, the level of control that a third party sponsor has over a user interface depends upon the level of compensation it provides. For example, a third party sponsor that provides high value may have substantial control of the user interface, e.g., background settings, idle time ad delivery, etc. Further, low compensation third party sponsors may only have limited access to the user interface, e.g., twice daily banner ads, instant messages, etc.

Figure 10:
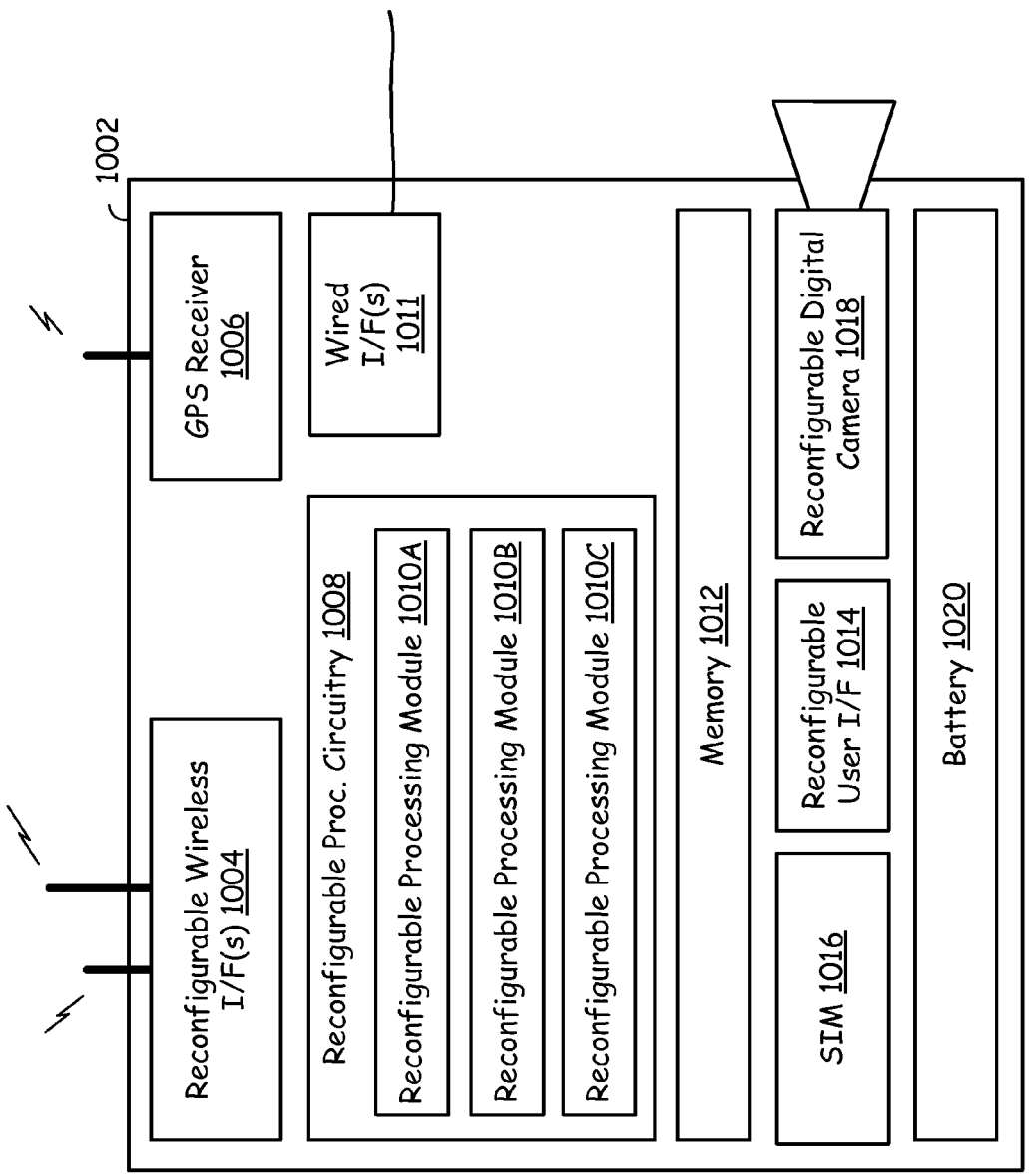
FIG. 10 is a block diagram illustrating a cell phone constructed according to one or more other embodiments of the present invention.

FIG. 10 is a block diagram illustrating a cell phone constructed according to one or more other embodiments of the present invention. The cell phone 1002 includes one or more reconfigurable wireless interfaces 1004, a GPS receiver 1006, reconfigurable processing circuitry 1008, and one or more wired interfaces 1010. Further, the cell phone 1002 includes memory 1012, one or more reconfigurable user interfaces 1014, a SIM card 1016 (receptacle for SIM card), a reconfigurable digital camera 1018, and battery 1020. Reconfigurable wireless interfaces 1004 may include one or more of a cellular network interface, a WWAN network interface, a WLAN network interface, and/or a WPAN network interface. The communication standards supported by several of these wireless interfaces were described herein with reference to FIG. 1. The reconfigurable wireless interface 1004 may be configured/reconfigured based upon association(s) with one or more sponsors. Over time, the reconfigurable wireless interface 1004 may be altered based upon sponsor settings. The reconfigurable wireless interface 1004 may include one or more processing components that may be configured/reconfigured based upon sponsor settings. The GPS receiver 1006 receives GPS information from a plurality of GPS satellites to enable determination of GPS coordinates of the cell phone 1002.

Reconfigurable processing circuitry 1008 includes one or more or multiple of a system processor, digital signal processor, application specific integrated circuit (ASIC), custom logic, video processor, audio processor, communications interface processor, and/or other hardware components. The reconfigurable processing circuitry 1008 enables execution of software instructions stored in memory 1012 and processing of data that is also stored in memory 1012, written to memory 1012, and/or retrieved from memory 1012. The reconfigurable processing circuitry 1008 may include a plurality of processing modules 1010A, 1010B, and 1010C that are configurable based upon one or more sponsor associations. For example, these reconfigurable processing modules 1010A, 1010B, and/or 1010C may be configured for video processing, audio processing, gaming, and/or other manners consistent with one or more sponsor associations. With one particular example, one or more of the reconfigurable processing modules 1010A, 1010B, and/or 1010C may be configured consistently with a media service as a sponsor, e.g., Home Box Office, Showtime, etc. When configured consistently with the sponsor association, a processing module 1010B, for example, may be specially configured to process media received from a sponsor server, e.g., to process streamed media. In another example, when the sponsor is a gaming company, one or more of the processing modules 1010A, 1010B, and/or 101C may be configured for gaming, such that the cell phone 1002 operates substantially as a gaming terminal.

Memory 1012 includes one or more RAM, ROM, FLASHRAM, FLASHROM, magnetic memory, optical memory, and/or another type of memory capable of storing software instructions and data. The memory 1012 may be configured/reconfigured based upon one or more sponsor associations. For example, the memory 1012 may be partitioned in differing manners based upon the sponsor association(s). The memory 1012 may be partitioned consistently with configuration of reconfigurable processing circuitry 1008.

The reconfigurable user interface 1014 may include a display, a keyboard, a pointing device, microphone, speakers, and/or other components that interface the cell phone 1002 with the user. One or more components of the reconfigurable user interface 1014 may be configured/reconfigured based upon one or more sponsor associations. The SIM 1016 is associated with a network operator or a combination of a network operator and one or more third-party sponsors. The SIM 1016 identifies the cell phone 1002 for subsequent operations in conjunction with a network operator and/or a third-party sponsor. The wired interface 1011 may include one or more of a serial interface and/or a parallel interface. For example, the wired interface 1010 may include a USB interface, a fire wire interface, or another type of interface that enables wired communications of the cell phone 1002 to another device also coupled to a wireless link. Reconfigurable digital camera 1018 is operable to take still and/or moving pictures and store such in memory 1012 and may be configured/reconfigured based upon one or more sponsor associations. The digital camera Battery 1020 provides power for the cellular phone 1002.

According to one aspect of the present invention, a desired association of the third-party sponsor is based upon receipt of data from the SIM 1016 of the cellular phone 1002. According to another aspect of the present invention, the cellular phone 1002 is operable to identify via a display of the user interface 1014 a plurality of available third-party sponsors. Further, the cellular phone 1002 is operable to receive input via the user interface 1014 from a user indicating selection of the third-party sponsor of a plurality of available third-party sponsors.

Figure 11:
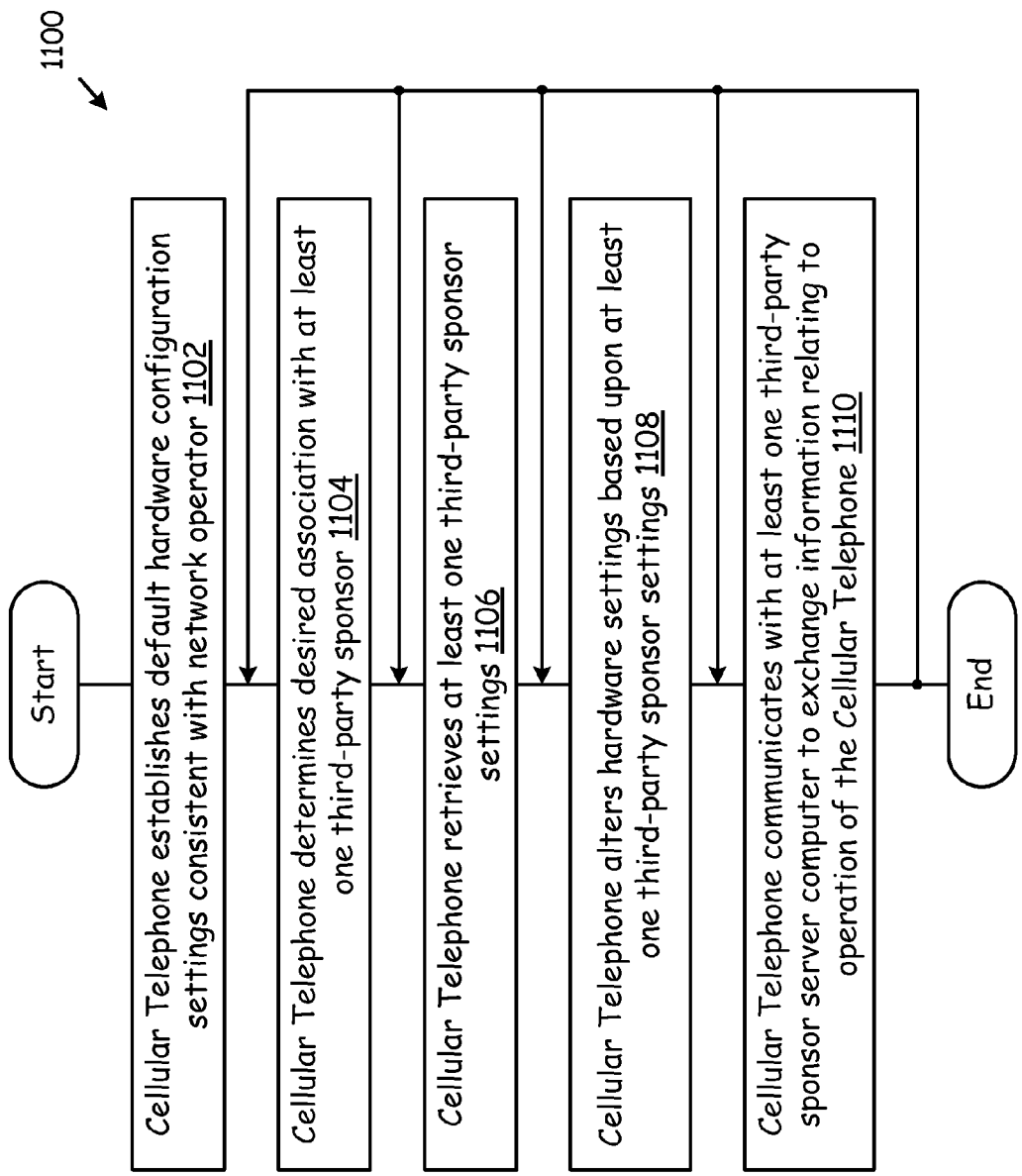
FIG. 11 is a flow chart illustrating operation according to still other embodiments of the present invention.

FIG. 11 is a flow chart illustrating operation according to still other embodiments of the present invention. The operations 1100 of FIG. 11 differ from those illustrated previously in FIGS. 2 and 5 in that hardware components of the cell phone are configured/reconfigured based upon one or more third-party sponsor associations. The operations 1100 of FIG. 11 commence with the cellular telephone establishing default hardware configuration settings consistent with a network operator and/or manufacturer (Step 1102). The cellular telephone then determines a desired association of at least one third-party sponsor (Step 1104). Then, based upon the association with the at least one third-party sponsor, the cellular telephone receives third-party sponsor settings (Step 1106). The cellular telephone then alters at hardware settings of one or more of its hardware components based upon the multiple third-party sponsor settings (Step 1108). Such configuration/reconfiguration may include altering processing circuitry configurations, wireless interface configurations, digital camera configurations, user interface configurations, and/or other hardware settings of the phone.

Then, the cellular telephone communicates with one or more third-party sponsored computers associated with the multiple third-party sponsors to exchange information related to operation of cellular telephone (Step 1110). From Step 1110, operation may end or may return to any of Steps 1104, 1106, and/or 1108 where other third-party sponsors associations are established or serviced. According to the operations of FIG. 11, altering hardware configurations of the cell phone may be done periodically, based upon user input, based upon interaction with a third-party sponsor server, and/or based upon other criteria. The hardware configurations may be altered daily, based upon a selected user profile, based upon time of day, based upon locale (GPS location determinant), and/or based upon other user input criteria or operational criteria.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A cellular telephone comprising:
a communications interface operable to service wireless communications with a cellular network infrastructure of a network operator; and
a user interface including a display and at least one input device;
processing circuitry coupled to the communications interface and to the user interface, the processing circuitry operable to:
establish default user interface settings for the user interface consistent with association with the network operator;
determine desired association with a third party sponsor;
based upon the desired association, retrieve third party sponsor settings;
alter the user interface settings based upon the third party sponsor settings,
wherein the altered user interface settings differ from the default user interface settings;
communicate with a third party sponsor server computer via the communications interface to exchange information relating to operation of the cellular telephone indicating alteration of the user interface settings from the default user interface settings;

communicate with the third party sponsor server computer via the communications interface information relating to one or more idle periods of the cellular telephone; and receive one or more communications from the third party sponsor server computer via the communication interface during the one or more idle periods of the cellular telephone.

2. The cellular telephone of claim 1, wherein determining a desired association with a third party sponsor is based upon receipt of data from a Subscriber Identity Module (SIM) associated with the cellular telephone.

3. The cellular telephone of claim 1, wherein in determining desired association with a third party sponsor, the processing circuitry is operable to:

identify via a display of the user interface a plurality of available third party sponsors; and receive input via the user interface indicating selection of the third party sponsor of the plurality of available third party sponsors.

4. The cellular telephone of claim 1, wherein the processing circuitry is further operable to:

determine desired association with a second third party sponsor, the second third party sponsor differing from the third party sponsor;

based upon the desired association with the second third party sponsor, retrieve second third party sponsor settings;

alter the user interface settings based upon the second third party sponsor settings, wherein the altered user interface settings differ from the default user interface settings; and alternate between the user interface settings based upon the third party sponsor settings and the user interface settings based upon the second third party sponsor settings.

5. The cellular telephone of claim 1, wherein the processing circuitry is further operable to:

receive a Coder/Decoder (CODEC) from the sponsor computer in response to association with the third party sponsor; and enact the CODEC to process custom content received from the third party sponsor server computer.

6. The cellular telephone of claim 1, wherein the processing circuitry is further operable to:

receive electronic advertisements from the third party sponsor server computer; and display the electronic advertisements upon the display.

7. The cellular telephone of claim 1:

further comprising a Global Positioning System (GPS) receiver coupled to the processing circuitry; and the processing circuitry operable to present on the display a location of the cellular telephone and the location of at least one third party sponsor site on a map.

8. The cellular telephone of claim 1, wherein:

retrieving third party sponsor settings includes downloading a sponsor related ringtone; and altering the user interface settings based upon the third party sponsor settings include enabling the sponsor related ringtone for communication announcement.

9. The cellular telephone of claim 1, wherein:

retrieving third party sponsor settings includes downloading a sponsor telephone directory; and altering the user interface settings based upon the third party sponsor settings include displaying availability of the sponsor telephone directory.

10. The cellular telephone of claim 1, wherein the processing circuitry is further operable to upload user data to the third party sponsor server.

11. The cellular telephone of claim 1, wherein the processing circuitry is further operable:

to receive a sponsor sales media interface; and alter the user interface to include the sponsor sales media interface.

12. The cellular telephone of claim 1, wherein the processing circuitry is further operable:

to receive at least one sponsor web site link; and alter the user interface to include the at least one sponsor web site link.

13. The cellular telephone of claim 1, wherein the processing circuitry is further operable:

to receive a sponsor gaming interface; and alter the user interface to include the sponsor gaming interface.

14. The cellular telephone of claim 1, wherein at least one of the communications interface, the user interface, and the processing circuitry is configurable based upon the third party sponsor settings.

15. A method for operating a telephone comprising:

establishing default user interface settings for a user interface of the telephone;

determining a desired association with a plurality of third party sponsors by receiving from the user interface a selection of a plurality of third party sponsors;

retrieving a plurality of third party sponsor settings from the selected plurality of third party sponsors;

altering the default user interface settings using the plurality of third party sponsor settings based upon a compensation value established for the selected plurality of third party sponsors, wherein the altered user interface settings differ from the default user interface settings; and communicating with one or more of the selected plurality of third party sponsors via a communications interface of the telephone to indicate alteration of the default user interface settings.

16. The method of claim 15, wherein altering the default user interface settings using the plurality of third party sponsor settings based upon a compensation value established for the selected plurality of third party sponsors comprises:

providing greater access control to the user interface of the telephone to a third party sponsor of the selected plurality of third party sponsors having a higher established compensation value than to a third party sponsor of the selected plurality of third party sponsors having a lower established compensation value.

17. The method of claim 15, further comprising:

receiving a Coder/Decoder (CODEC) from one of the selected plurality of third party sponsors computer in response to association with the one of the plurality of third party sponsors; and enacting the CODEC to process custom content received from the one of the selected plurality of third party sponsors computer .

18. The method of claim 15, further comprising:

receiving electronic advertisements from one of the selected plurality of third party sponsors computer; and displaying the electronic advertisements upon a display of the telephone.

19. The method of claim 15, further comprising:

determining a location of the telephone by accessing a Global Positioning System (GPS) receiver of the cellular telephone;

determining a desired association with one of the plurality of third party sponsors based on the time of day and the location of the cellular phone;

altering the user interface settings based upon settings of the determined one of the plurality of third party sponsors; and presenting on a display of the telephone a location of the telephone and the location of at least one site on a map of the determined one of the plurality of third party sponsors.

20. The method of claim 15, wherein:

retrieving the plurality of third party sponsor settings includes downloading a sponsor related ringtone; and altering the default user interface settings using the plurality of third party sponsor settings based upon a compensation value established for the selected plurality of third party sponsors includes enabling the sponsor related ringtone for communication announcement.

21. The method of claim 15, wherein:

retrieving the plurality of third party sponsor settings includes downloading a sponsor telephone directory; and altering the default user interface settings using the plurality of third party sponsor settings based upon a compensation value established for the selected plurality of third party sponsors includes displaying availability of the sponsor telephone directory.

22. The method of claim 15, further comprising:

receiving a sponsor sales media interface; and altering the user interface to include the sponsor sales media interface.

23. The method of claim 15, further comprising:

receiving at least one sponsor web site link; and altering the user interface to include the at least one sponsor web site link.

24. The method of claim 15, further comprising:

receiving a sponsor gaming interface; and altering the user interface to include the sponsor gaming interface.

25. The method of claim 15, further comprising reconfiguring at least one of a communications interface, the user interface, and processing circuitry of the telephone based upon the plurality of third party sponsor settings.

26. A cellular telephone comprising:

a communications interface operable to service wireless communications with a cellular network infrastructure of a network operator; and a user interface including a display and at least one input device;

configurable processing circuitry coupled to the communications interface and to the user interface, the processing circuitry operable to:

establish a default processing circuitry configuration consistent with association with the network operator;

receive from the user interface a selection of a third party sponsor;

retrieve third party sponsor settings of the selected third party sponsor;

alter the processing circuitry configuration based upon the third party sponsor settings, wherein the altered processing circuitry configuration differs from the default processing circuitry configuration;

communicate with a third party sponsor server computer via the communications interface to exchange information relating to operation of the cellular telephone indicating information relating to one or more idle periods of the cellular telephone; and receive one or more communications from the third party sponsor server computer via the communication interface during the one or more idle periods of the cellular telephone.

27. The cellular telephone of claim 26, wherein at least one of the communications interface and the user interface is also configurable based upon the third party sponsor settings.

* * * * *